Sept. 10, 1929.  E. F. KELLEY  1,727,717

AUTOMOBILE BRAKE

Filed July 20, 1927

Inventor
Edward F. Kelley
By Vorster & Davis
Attorneys

Patented Sept. 10, 1929.

1,727,717

UNITED STATES PATENT OFFICE.

EDWARD F. KELLEY, OF BRIDGEPORT, CONNECTICUT, ASSIGNOR TO THE RAYBESTOS COMPANY, OF BRIDGEPORT, CONNECTICUT, A CORPORATION OF CONNECTICUT.

AUTOMOBILE BRAKE.

Application filed July 20, 1927. Serial No. 207,070.

This invention relates to brakes, particularly automobile brakes of the internal type, and has for an object to provide a brake of this type in which there will be a substantially equal and uniform bearing all the way around the drum by the brake elements so as to secure a maximum active or effective braking surface for the size of the brake and thus secure a maximum braking effect.

It is also an object of the invention to provide a brake of this character which is very simple in construction and may be applied with a minimum of effort on the part of the operator, and which will quickly and effectively release when released by the operator.

Figure 1:
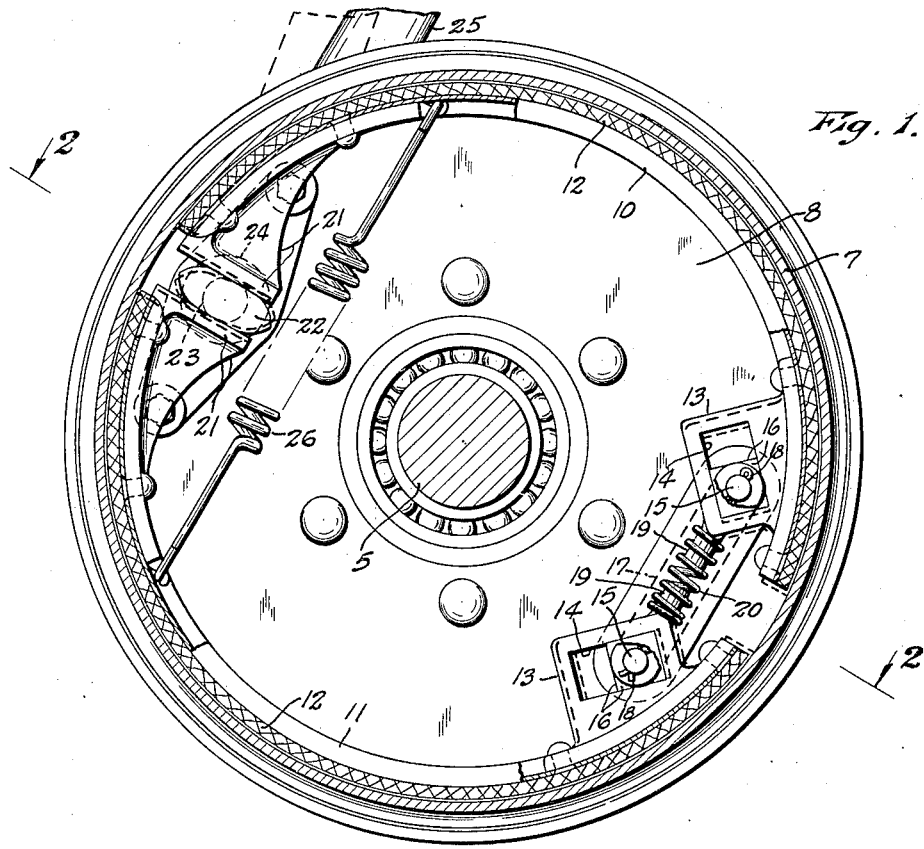
Figure 2:
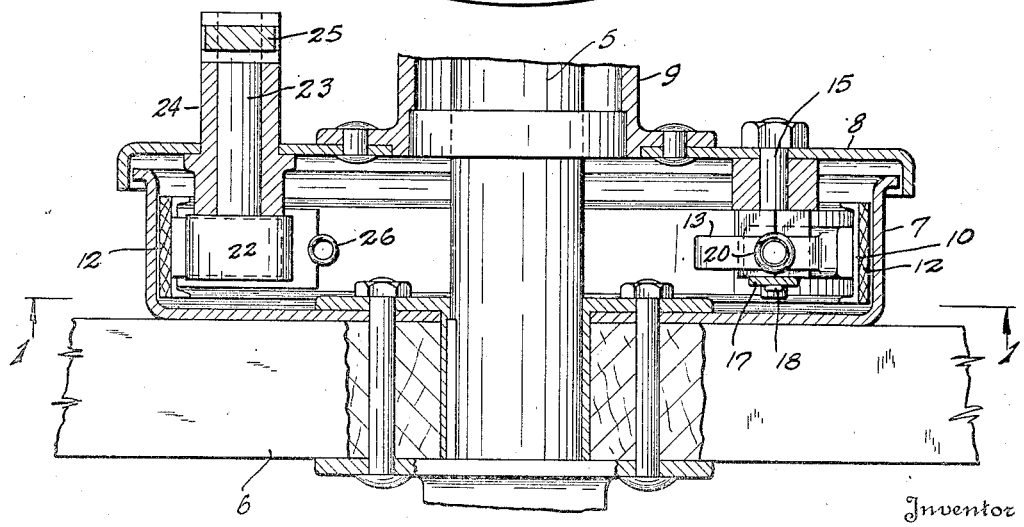

With the foregoing and other objects in view, I have devised the construction illustrated in the accompanying drawing forming a part of this specification. In this drawing, Fig. 1 is a vertical section through a brake drum substantially on line 1—1 of Fig. 2 showing my improved brake as applied thereto, and Fig. 2 is a transverse section substantially on line 2—2 of Fig. 1.

In this drawing 5 indicates the driving axle or shaft for the wheel 6 to which is secured the drum 7 to rotate therewith. The inner side of this drum is closed by the stationary plate 8 secured to the rear axle housing 9 and forming a support for the brake elements. In the present instance the brake comprises two movable segments 10 and 11 carrying on their outer or curved surfaces the friction elements 12 of any suitable material such as the usual asbestos brake lining. Adjacent a pair of the adjacent ends of these segments, at their lower ends in the present instance, there is secured to each segment a lug or block 13, and each of these lugs has an inclined elongated opening 14, preferably of substantially rectangular shape; and it will be apparent from Fig. 1 that these openings are inclined in opposite directions and inwardly from the adjacent ends of the segments and they are, therefore, inclined to the peripheries of the segments. Mounted on the supporting plate 8 are studs 15 carrying blocks 16 which project into the openings 14. These blocks are preferably substantially rectangular in shape and these blocks and the sides of the openings 14 form cooperating cam elements to shift the segments outwardly and inwardly toward and from the drum as will presently be described. The blocks 16 are retained on the studs by a tie plate 17 extending between the studs and secured thereon by any suitable means, such as cotter pins 18. This plate also forms means for securing the lugs 13 in proper position on the blocks. Each lug 13 has a stud 19 extending toward the lug on the opposite segment to receive a coiled compression spring 20. This spring, therefore, tends to separate these lugs and the corresponding adjacent ends of the segments.

Adjacent their opposite ends the segments carry ears 21 arranged to engage the opposite sides of an oblong cam element 22, the opposite sides of which are preferably curved as shown. This element is secured to a shaft 23 mounted to turn in a suitable bearing 24 carried by the support 8, and may be turned by a suitable lever 25 connected to the operating means, such as the emergency brake lever adjacent the driver's position. A tension spring 26 is secured at its opposite ends to the two segments adjacent their ends carrying the ears 21 so that it tends to draw these ends together and hold the ears 21 against the opposite sides of the cam 22.

The operation is as follows: When the lever 25 is swung, as indicated to the dotted line position, it will turn the cam 22 a partial revolution, and as this cam is elongated the opposite curved side surfaces cooperating with the ends of the ears 21 will separate the adjacent ends of the segments, as indicated in dotted lines, forcing the segments outwardly against the surface of the drum and also circumferentially of the drum. This circumferential movement shifts the opposite ends of the segments carrying the lugs 13 toward each other, as indicated in dotted lines, and this movement by cooperation of the cam elements 16 and the inclined openings 14 shift the segments outwardly against the inner surface of the drum, and the pressure of these segments against the inner surface of the drum, and therefore, their braking effect will depend upon the pressure exerted by the cam 22. As neither end of the segment is anchored against movement the entire segment is shifted outwardly against the drum so that the entire length of the friction element is pressed with a substantially uniform pressure throughout its entire length against the surface of the drum producing a substantially uniform and equal pressure throughout the entire length of the segment and giving the maximum braking effect. It is preferred that the two segments be made of equal length so as to secure the same braking effect whether the vehicle is moving forwardly or backwardly, but I do not wish to be limited to this arrangement.

There is also a wrapping effect due to the frictional action of the drum on the segment which in cooperation with the cam elements 14 and 16 tends to press one of the segments more tightly against the drum. For instance, if the drum is rotating clockwise, as viewed in Fig. 1, the frictional engagement between the upper segment 10 and the drum will tend to shift this segment to the right or clockwise. This movement through the action of the cam elements 14 and 16 will tend to press this segment still more tightly against the surface of the drum. This effect together with the double cam 22 and the extensive effective or braking surface makes this brake very easy to operate, and therefore, it requires less pressure on the brake operating lever to stop the car. One of the main objections to most of the brakes now generally employed, especially in brakes in which one end is anchored, is that most of the braking effect is secured only adjacent one end of the brake elements and that adjacent the operative means for setting the brakes. This brake does not have that objection as substantially the same braking effect is secured throughout the entire length of the segment.

When pressure on the brake lever 25 is removed the segments are quickly shifted away from the drum by means of the springs 20 and 26. The spring 20 tends to shift the lugs 13, and therefore, the corresponding ends of the segments away from each other. Therefore, this movement by cooperation of the blocks 16 and the inclined openings 14 will shift this portion of the segments away from the drum. Similarly the spring 26 tends to draw the other ends of the segments toward each other and away from the drum when the cam 22 turns back to its normal position parallel with the ends of the ears 21, as indicated in full lines, Fig. 1. It will also be apparent from an inspection of the drawing that the brake is very simple in construction requiring a small number of parts which are of rugged construction and may be easily and quickly assembled. It will be clear from the foregoing description that both ends of the segments are movable toward and from the drum and therefore, the segments are shifted bodily as a whole toward and from the drum as the brake is set or released.

Having thus set forth the nature of my invention, what I claim is:

1. In an internal brake, a rotary drum, a pair of segments including friction elements to engage the interior of the drum, lugs carried by the segments adjacent one end having slots inclined in opposite directions to their circumferences, stationary blocks in said slots and forming with them cam guides to shift the segments toward and from the drum, and operative means to produce relative movement between the blocks and segments to shift the segments.

2. In an internal brake, a rotary drum, a pair of segments including friction elements to engage the interior of the drum, a stationary support, cam elements carried by said support, lugs carried by the segments adjacent one end thereof, said lugs having elongated openings to receive the cam elements and inclined in opposite directions so that upon circumferential movement of the segments toward each other the cooperation of the cam elements and the walls of the openings will shift the segments outwardly toward the drum, a spring between the segments tending to separate them, a movable cam at the other ends of the segments adapted to separate said ends, and means for operating the latter cam.

3. In an internal brake, a rotary drum, a pair of segments including friction elements to engage the interior of the drum, lugs carried by the segments adjacent their ends at one side of the drum, said lugs having openings inclined inwardly away from the drum and in opposite directions, cam elements carried by said support and extending into said openings to cooperate therewith to shift the segments, a spring between the segments adjacent said ends tending to separate them, a rotary oblong cam between the opposite ends of the segments, a spring adjacent these ends tending to draw them together and hold them against the cam, and operative means for turning the latter cam.

In testimony whereof I affix my signature.

EDWARD F. KELLEY.